March 25, 1930.　　W. M. GENTLE　　1,751,693
LUBRICATOR
Filed Nov. 10, 1928
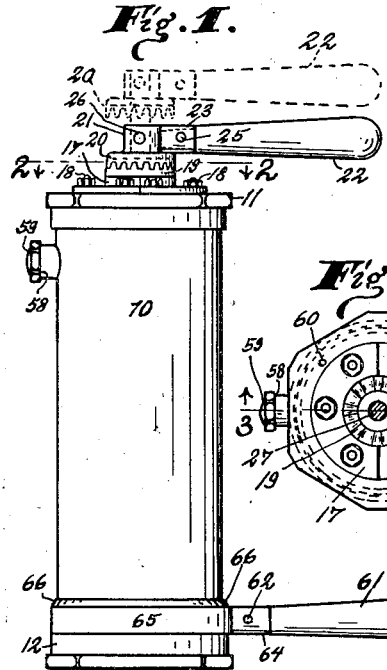
Inventor.
William M. Gentle.
Attorney.

Patented Mar. 25, 1930

1,751,693

UNITED STATES PATENT OFFICE

WILLIAM M. GENTLE, OF LOS ANGELES, CALIFORNIA

LUBRICATOR

Application filed November 10, 1928. Serial No. 318,501.

This invention relates to a portable lubricator for discharging lubricants into grease cups and the like, and the principal object thereof is to provide a lubricator in which pressure can be manually applied to charges of lubricant to discharge it from the lubricator nozzle when in use; and with means for maintaining a pressure on the lubricant in the container that can be manually released when it is not in use. To that end I provide a lubricator having a lever adapted to be manually operated to open a valve so as to discharge charges of lubricant from the nozzle, and also having a container adapted to hold a lubricant with a piston therein that is adapted to be manually moved toward the lubricant to apply pressure thereon so the lubricant in the valve housing can not pass back into the container when the valve is moved to open the nozzle with the means for applying the pressure reversible so that the pressure can be released when the apparatus is idle, so that excessive leakage or waste of the lubricant is avoided if inadvertently the discharge passage from the lubricator is held open when not in use.

In other words when the lubricator is used to fill grease cups and bearings the piston is first moved in a direction to apply pressure on the lubricant to force it into the valve housing and prevent it from returning to the container when the valve is moved to open the passage through the nozzle. It is obvious that the piston can be moved in the reverse direction to release the pressure on the lubricant, and if desired can be moved in the reverse direction far enough to apply suction to the lubricant to hold it in the cylinder so that it cannot escape through the discharge nozzle.

A feature of invention is shown in the means for actuating the piston toward or from the lubricant in the cylinder, which means includes a lever and handle that are conveniently arranged to apply a greater or less pressure to the lubricant, and also to manipulate the apparatus in reference to oil cups and bearings and to open the passage through the discharge nozzle and boost the lubricant through the nozzle.

Another feature of invention is shown in the construction and arrangement of the plunger head whereby the plunger thereof when in closed position extends entirely through the nozzle to close the opening therethrough when not in use, and also this plunger, when the appliance is in use, is utilized to drive out substantially all of the lubricant from the nozzle into the oil cup or bearing.

Another feature of invention is shown in the construction, combination and arrangement of parts whereby the clutch members are normally held engaged so that the lever can be manipulated to actuate the piston each time there is a charge of lubricant discharged from the nozzle so that the piston can be made to engage the upper surface of the lubricant with considerable pressure, as previously stated, so that the lubricant in the valve housing will be caused to bypass around the check valve when the lever is actuated to open the nozzle, and also the clutch members are constructed so they can easily be disengaged without affecting the piston when the lever is moved to open the passage through the nozzle.

Other objects, advantages and features of invention may appear from the accompanying drawing and the subjoined detailed description and the appended claims.

The accompanying drawing illustrates the invention.

Fig. 1 is a perspective side view of the lubricator with the operating lever in normal position and showing by dotted lines the position of this lever when moved to open the passage through the discharge nozzle.

Fig. 2 is a cross section on line 2—2, Fig. 1, showing parts in end elevation.

Fig. 3 is an enlarged fragmental central vertical section on line 3—3, Fig. 2, showing the operating parts in normal position and the cylinder fully charged with lubricant.

Fig. 4 is a cross section on line 4—4, Fig. 3, showing a recess in the valve housing for passing lubricant around the valve head when the nozzle is being closed.

Fig. 5 is a fragmental cross section on line 5—5, Fig. 3 drawn to a slightly smaller scale, and showing a detail of the piston and associated parts.

Fig. 6 is a perspective view of the lower end portion of the valve stem, valve head and plunger.

Fig. 7 is an enlarged fragmental vertical section through the lower end of the apparatus analogous to the lower end portion shown in Fig. 3, showing the valve head in open position and the plunger moved to open the passage through the nozzle; and also showing a charge of lubricant from above the valve head bypassed through the check valve to a position below the valve head to fill the nozzle, and also the piston is shown moved down to a position near the lower end of the lubricant chamber.

The lubricator includes a cylindrical container 10 having its ends closed by the cap 11 at the inlet end and by a valve housing 12 at its discharge end.

A hollow screw 13 is extended down through a central opening 14 in the cap 11 into the inner end of a central bore 15 in the valve housing 12, and this screw is supported on a flange 16 that rests on the upper side of the cap 11.

The opening 14 and bore 15 are arranged so they form bearings in which the screw 13 can be rotated and so they hold the screw in axial alignment with the container 10.

A split bushing 17 is secured to the cap 11 by bolts 18 so as to hold the screw 13 from endwise movement and above this bushing and integral with the screw 13 is a clutch member 19 that is adapted to be engaged by the clutch member 20 that is integral with the head 21 to which the hand lever 22 is connected.

Preferably the head 21 is provided with a stem 23 in which there is a socket 24 into which one end of the lever 22 can be extended and secured by a pin 25 so that the lever can be formed of wood or other light material.

Also connected to the head 21 by a pin 26 is one end of the valve stem 27 that is extended down through the hollow screw 13 into the bore 15 in the valve housing.

The valve stem 27 adjacent its lower end is provided with an enlarged valve head 28 that is formed to slidingly fit in the bore 15 and is normally held seated on the valve seat 29 by a spring 30 that is interposed between the head 28 and the inner end of the screw 13, this spring 30 also normally holds the clutch members 19, 20 engaged.

The head 28 is provided with a cylindrical plunger 31 that is a sliding fit in the discharge opening 32 through the nozzle 33, and also there is an extension 34 on the plunger 31 that is a snug fit into the reduced opening at the discharge end of the nozzle so that when the head, plunger and extension are in their normal position the opening through the nozzle is very effectively closed and the extreme end of the extension is flush with the end of the nozzle.

The foregoing described construction and arrangement of the head, plunger and extension are not only to close the passage through the nozzle but also to drive substantially all of the lubricant out of the nozzles into the oil cups or bearings when the apparatus is in use, so that there is no residue of lubricant remaining in the nozzle to drip out when it is withdrawn from the openings into the cups or bearings.

Heretofore lubricant discharging apparatus have been formed so that a small quantity of lubricant remains in the nozzle or discharge opening that is exposed so as to accumulate dust or sand that is injected into the oil cups and bearings the next time the apparatus is used to the injury of the bearings, and in applicant's apparatus this waste of lubricant and injury to the bearings is avoided as the nozzle after use can be wiped off so that it will not accumulate dust or sand.

The nozzle 33 is shown integral with the valve housing but it is understood that it can be a separate part if so desired and can be threaded for a valve fitting, as indicated in Fig. 7. Also the extreme end of the nozzle can be slightly tapered as it fills the opening into oil cups or bearings to resist back pressure, and also the discharge end can be notched as at 33' so that when the end of the nozzle engaged a ball check valve the lubricant can escape through the notches around the ball into the oil cups or bearings.

The lubricant 35 is admitted to the bore 15 through a passage 36 in the valve housing and another passage 37 in the housing leads from the bore 15 to the valve chamber 38 in which the ball check valve 39 is normally held by the spring 40 in closed position on the valve seat at the discharge end of the passage 37.

The chamber 38 is connected to the bore 15 by a passage 41 so that when the valve head 28 is raised against the pressure of the spring 30 the lubricant above it will be forced through the check valve 39 as the piston prevents the lubricant from passing back into the container through the passage 36. From the chamber 38 the lubricant passes to the bore 15 to fill the space below the head 28 and the opening in the nozzle.

The space below the head and in the nozzle is sufficiently large to hold a charge of lubricant that will fill an ordinary oil cup. The wall of the bore 15 is recessed, as at 42, so that the lubricant can by-pass around the head when the plunger has closed the passage through the nozzle.

The piston 43 includes a screw head 44 that is adapted to be moved from end to end of the container 10 by the screw 13.

Integral with the head 44 is a disk 45 to which another disk 46 is secured by bolts 47, and between these disks the gaskets 48 and 49 are secured.

The gaskets 48 and 49 can be of any suitable material such as leather or rubber and they are arranged to engage the inner wall of the container 10 and prevent leakage of the lubricant around the piston.

The piston is held from rotation in the container 10 by a guide rod 50 which has its end 51 screwed into a socket 52 in the valve housing and the other end is extended through a spider 53 that is secured between the cap 11 and the end of the container 10 so that it is held from rotation when the screw 13 is rotated to move the piston. The guide rod 50 is arranged off center to the axis of the piston and is extended through it so that the piston can not rotate but can be moved endwise of the container 10 by rotation of the screw 13.

The disk 46 is provided with an extension 54 through which the rod 50 passes and in which there is a suitable packing 55 around the rod that is held in place by a nut 56.

A socket 57 is arranged in the housing 12 into which the extension 54 and nut 56 can pass when the piston 43 is at the limit of its movement toward the valve housing 12 or the discharge end of the apparatus.

An inlet port 58 is arranged in the cylindrical container 10 adjacent the cap 11 or at the inlet end of the apparatus through which lubricant can be passed into the container, and this port is normally closed by a screw plug 59.

A vent hole 60 is extended through the cap 11 so that the air between the cap and piston can exhaust when the piston is being moved toward the cap and vice versa. This vent hole is shown in the upper left hand corner of Fig. 2.

To facilitate handling the apparatus I provide a handle 61 that is secured by a pin 62 in a socket 63 of an extension 64 that is integral with a band 65 that is shrunk on the outside wall of the container 10 between the shoulder 66 and the upper rim of the valve housing 12.

The handle 61 is arranged so that it can be held by one hand of an operator to support the apparatus and direct the nozzle into the openings of oil cups and bearings while the other hand of the operator is free to manipulate the lever 22 to rotate the screw 13 to actuate the piston toward or from the lubricant and also to move the valve stem 27 endwise to open and close the passage through the nozzle to normally discharge the charges of lubricant from the nozzle into oil cups or bearings.

In the operation of applying pressure to the lubricant in the cylinder the handle 61 coacts with the lever 22. In other words the operator can utilize both the lever and handle to apply the pressure or use either separately as may be desired. That is, when the lever is alone actuated to apply the pressure the handle is held in a relatively fixed position and vice versa; and when both are used simultaneously it is obvious that they are moved in reverse directions around the longitudinal axis of the cylinder.

In operation the container 10 is charged with lubricant through the port 58, then with this port closed the operator manipulates the apparatus by means of the handle 61 and lever 22 to apply a suitable pressure to the lubricant in the container to drive it out into the valve housing through the passages 36 and prevents back pressure through this passage when the valve 28 is open. Then the apparatus is moved to extend the nozzle 33 into the inlet openings in oil cups or bearings with sufficient force to close the openings and to resist back pressure of the lubricant when the lever is manually manipulated to discharge a charge of lubricant from the nozzle into the oil cup or bearing. The valve 28 is opened by moving the lever 22 endwise of the cylinder against the pressure of the spring 30 until the plunger 31 is entirely out of the opening through the nozzle so that the lubricant by-passing from above the head 28 can pass the check valve 39 and then enter the opening through the nozzle from whence it can be driven with great force into the oil cups or bearings by a reverse movement of the lever.

Then a further forced movement of the lever toward seating the valve 28 causes the lubricant between the valve 28 and valve seat 29 to be by-passed through the recess 42 and simultaneously the plunger 31 boosts the lubricant from the nozzle into the oil cups or bearing, and when the valve 28 is fully seated the plunger 31 is fully extended through the nozzle so that there is no residue of lubricant therein to leak out or remaining to accumulate dust or dirt that is forced into the oil cups or bearings when the apparatus is again used. In other words, the nozzle and tip of the extension on the plunger are constructed so that they can be wiped off by an operator after being used as previously stated so that they are entirely free of lubricant.

I claim as my invention:

1. A lubricator for discharging lubricant into oil cups and bearings including a container, a nozzle connected to said container, a valve head for opening and closing a passage to said nozzle, a plunger on said head that is normally extended through a passage through said nozzle, yielding means for normally holding said valve head in a closed postion so that the end of the plunger is flush with the end of said nozzle, and manually operable means for moving said head to open position and to remove said plunger from said nozzle.

2. A lubricator for discharging lubricant into oil cups and bearings including a container, a valve housing detachably connected to the discharge end of said container, a nozzle integral with said housing, a valve head in said housing that is adapted to open and close a passage to said nozzle, a spring for normally holding said valve head in closed position, a plunger secured to said head that is normally extended through said nozzle so as to close the passage therethrough, a valve stem connected to said valve head, a lever connected to said stem for actuating said valve head and plunger to open position, a piston for applying pressure to the lubricant in said container, and a detachable connection between said lever and piston whereby the latter can be actuated.

3. A lubricator for discharging lubricant into oil cups and bearings including a container, a valve housing at the discharge end of said container, a nozzle connected thereto, a valve head in said housing that is adapted to open and close a passage to said nozzle, a spring for normally holding said valve head in closed position, a plunger secured to said head that is normally extended through said nozzle so as to close the passage therethrough, a valve stem connected to said valve head, means for actuating said valve stem to move said valve head and plunger to open position, and a reversible piston for applying pressure to the lubricant in said container so it will be caused to by-pass through a check valve to the opening in said nozzle when said plunger and valve head are moved to open position.

4. A lubricator for discharging lubricant into oil cups and bearings including a container having an inlet and a discharge end, a valve housing secured to the discharge end of said container, said housing having a bore arranged centrally therethrough, a nozzle connected to said housing that has an opening therethrough that is aligned with the bore through said housing, a valve head in the bore that normally closes a passage to said nozzle, a plunger on said head that normally extends through the passage through said nozzle, a hollow screw arranged centrally in said container that has one end extended into the bore in said valve housing, a valve stem extending from said head up through said screw, and a spring surrounding said stem that is interposed between said valve head and the end of said screw, and a lever secured to one end of said valve stem for moving said valve head and plunger to open a passage from said container out through said nozzle.

5. A lubricator for discharging lubricant into oil cups and bearings including a container having an inlet and a discharge end, a valve housing detachably secured to the discharge end of said container, said housing having a bore arranged centrally therethrough, a nozzle connected to said housing that has an opening therethrough that is aligned with the bore through said housing, a valve head in the bore that normally closes a passage to said nozzle, a plunger on said head that normally extends through the passage through said nozzle, a hollow screw arranged centrally in said container that has one end extended into the bore in said valve housing, a valve stem extending from said head up through said screw, a spring surrounding said stem that is interposed between said valve head and the end of said screw, a lever secured to one end of said valve stem for moving said valve head and plunger to open a passage from said container out through said nozzle, a piston in said container that is adapted to be actuated by said screw to apply pressure to the lubricant in said container, a clutch member on one end of said screw, and another clutch member in said lever whereby said piston can be actuated when said clutch members are engaged.

6. A lubricator for discharging lubricant into oil cups and bearings including a container having an inlet and a discharge end, a valve housing secured to the discharge end of said container, said housing having a bore arranged centrally therethrough, a nozzle connected to said housing that has an opening therethrough that is aligned with the bore through said housing, a valve head in the bore that normally closes a passage to said nozzle, a plunger on said head that normally extends through the passage through said nozzle, a hollow screw arranged centrally in said container that has one end extended into the bore in said valve housing, a valve stem extending from said head up through said screw, a spring surrounding said stem that is interposed between said valve head and the end of said screw, a lever secured to one end of said valve stem for moving said valve head against the tension of said spring to open a passage from said container through said nozzle, a ball check valve interposed in the passage between said container and nozzle, and means connected with said lever including a piston on said screw for applying pressure to the lubricant in said container so that the lubricant will be caused to by-pass to the opening through said nozzle when said valve head and plunger are moved to open position.

7. A lubricator for discharging lubricant into oil cups and bearings including a container having an inlet and an outlet end, an annular shoulder adjacent the outlet end, a head detachably secured to the outlet end, an annular band secured between said head and shoulder, a nozzle, a handle secured to said band for manipulating said container so as to force the nozzle into the inlet passages into the oil cups and bearings so as to close the passages against back pressure, a valve head for opening and closing a passage from said container to the nozzle, a lever adapted to be used with said handle to manipulate said container and also movable endwise of said container for actuating said valve head, means operable by said lever for applying pressure to the lubricant in said container so it will be caused to pass into the opening in said nozzle when said valve head is moved to open position, and a plunger on said valve head for boosting the lubricant out of said nozzle when said valve head is moved toward closed position.

8. A lubricator for discharging lubricant into oil cups and bearings including a container having a nozzle, a handle for manipulating said container so as to force the nozzle into the inlet passages into the oil cups and bearings so as to close the passages against back pressure, a valve head for opening and closing a passage from said container to the nozzle, a lever movable endwise of said container for actuating said valve head, means including a piston and clutch operable by said lever for applying pressure to the lubricant in said container so it will be caused to pass to an opening in said nozzle when said valve head is moved to open position, a plunger on said valve head for boosting the lubricant out of said nozzle when said valve head is moved toward closed position, and means for bypassing lubricant around said valve head when the passage through the nozzle is closed by said plunger.

9. A lubricator for discharging lubricant into oil cups and bearings including a container, a nozzle connected thereto, a valve head for opening and closing a passage from said container to said nozzle, a hollow screw arranged in said container, means for holding said screw from endwise movement, a valve stem having one end integral with said valve head and extended through said screw, a spring on said stem that is interposed between said valve head and an end of said screw, a lever secured to the other end of said valve stem, a clutch member on said lever arranged to engage a clutch member on said screw, and a piston on said screw that is arranged to be reciprocated endwise of said container, said lever adapted to be rotated around the longitudinal axis of said container to move said piston and to be moved endwise of said container to move said valve head toward open and closed position.

10. A lubricator for discharging lubricant into oil cups and bearings including a container, a nozzle connected thereto, a valve head for opening and closing a passage from said container to said nozzle, a hollow screw arranged in said container, means for holding said screw from endwise movement, a valve stem having one end integral with said valve head and extended through said screw, a spring on said stem that is interposed between said valve head and an end of said screw, a lever secured to the other end of said valve stem, a clutch member on said lever arranged to engage a clutch member on said screw, a piston on said screw that is arranged to be reciprocated endwise of said container, said lever adapted to be rotated around the longitudinal axis of said container to move said piston and to be moved endwise of said container to move said valve head toward open and closed position, a plunger on said valve head adapted to boost the lubricant out of said nozzle when said valve head is moved toward closed position, and a handle on said container for the purpose specified.

In testimony whereof I affix my signature.

WILLIAM M. GENTLE.